United States Patent
Bohn

[19]

[11] Patent Number: 6,033,086
[45] Date of Patent: Mar. 7, 2000

[54] COMPACT ILLUMINATION SYSTEM FOR IMAGE SCANNER

[75] Inventor: David D. Bohn, Fort Collins, Colo.

[73] Assignee: Hewlett-Packard Company, Palo Alto, Calif.

[21] Appl. No.: 09/070,142

[22] Filed: Apr. 30, 1998

[51] Int. Cl.[7] .................................................. F21V 1/00
[52] U.S. Cl. ......................... 362/235; 362/249; 358/473; 382/313
[58] Field of Search ................................... 362/109, 249, 362/247, 297, 235, 301, 97, 98, 99, 346; 355/67; 382/313; 358/473, 475

[56] References Cited

U.S. PATENT DOCUMENTS

| | | | |
|---|---|---|---|
| 3,818,216 | 6/1974 | Larraburu | 240/41.3 |
| 4,517,631 | 5/1985 | Mullins | 362/346 |
| 4,926,041 | 5/1990 | Boyd . | |
| 4,959,541 | 9/1990 | Boyd . | |
| 5,038,028 | 8/1991 | Boyd et al. . | |
| 5,089,712 | 2/1992 | Holland | 250/557 |
| 5,306,908 | 4/1994 | McConica et al. . | |
| 5,381,020 | 1/1995 | Kochis et al. . | |
| 5,519,513 | 5/1996 | Copenhaver et al. | 358/475 |
| 5,523,562 | 6/1996 | Maple . | |
| 5,552,597 | 9/1996 | McConica . | |
| 5,578,813 | 11/1996 | Allen et al. . | |
| 5,586,212 | 12/1996 | McConica . | |
| 5,632,551 | 5/1997 | Roney et al. | 362/249 |
| 5,646,402 | 7/1997 | Khovaylo et al. . | |
| 5,764,493 | 6/1998 | Liao | 358/473 |
| 5,865,528 | 2/1999 | Compton et al. | 362/300 |
| 5,923,444 | 7/1999 | Bohn | 358/473 |

*Primary Examiner*—Sandra O'Shea
*Assistant Examiner*—John Anthony Ward

[57] ABSTRACT

A compact illumination system for illuminating a scan region on an object may comprise a light source for producing a plurality of light rays. A first reflector is positioned adjacent the light source and is coplanar with a first plane that is located in generally parallel, spaced-apart relation to a scan plane. The first reflector directs toward the scan region some of the light rays produced by the light source. A second reflector is positioned adjacent the light source and is coplanar with a second plane that is not parallel to the scan plane. The second reflector directs toward the scan region some of the light rays produced by the light source.

24 Claims, 4 Drawing Sheets

COMPACT ILLUMINATION SYSTEM FOR IMAGE SCANNER

FIELD OF INVENTION

This invention relates to scanner devices in general and more specifically to illumination systems for hand-held scanner devices.

BACKGROUND

Optical scanner devices are well-known in the art and produce machine-readable image data signals that are representative of a scanned object, such as a photograph or a page of printed text. In a typical scanner application, the image data signals produced by an optical scanner may be used by a personal computer to reproduce an image of the scanned object on a suitable display device, such as a CRT or a printer.

A hand-held or portable optical scanner is an optical scanner which is designed to be moved by hand across the object or document being scanned. The hand-held scanner may be connected directly to a separate computer by a data cable. If so, the data signals produced by the hand-held scanner may be transferred to the separate computer "on the fly," i.e., as the image data are collected. Alternatively, the hand-scanner may include an on-board data storage system for storing the image data. The image data may then be downloaded to a separate computer after the scanning operation is complete by any convenient means, such as via a cable or an optical infrared data link.

Hand-held or portable optical scanners are well-known in the art and various components thereof are disclosed in U.S. Pat. No. 5,552,597 of McConica for "Hand-Held Scanner having Adjustable Light Path", U.S. Pat. No. 5,586,212 of McConica, et al., for "Optical Wave Guide for Hand-Held Scanner," U.S. Pat. No. 5,381,020 of Kochis, et al., for "Hand-Held Optical Scanner with Onboard Battery Recharging Assembly," and U.S. Pat. No. 5,306,908 of McConica, et al., for "Manually Operated Hand-Held Optical Scanner with Tactile Speed Control Assembly," all of which are hereby incorporated by reference for all that they disclose.

A typical hand-held optical scanner may include illumination and optical systems to accomplish scanning of the object. The illumination system illuminates a portion of the object (commonly referred to as a "scan region"), whereas the optical system collects light reflected by the illuminated scan region and focuses a small area of the illuminated scan region (commonly referred to as a "scan line") onto the surface of a photosensitive detector positioned within the scanner. Image data representative of the entire object then may be obtained by sweeping the scan line across the entire object, usually by moving the hand-held scanner with respect to the object. By way of example, the illumination system may include a light source (e.g., a fluorescent or incandescent lamp or an array of light emitting diodes (LEDs)). The optical system may include a lens and/or mirror assembly to focus the image of the illuminated scan line onto the surface of the detector. Alternatively, a "contact image sensor" or CIS may be used to collect and focus light from the illuminated scan region onto the detector.

The photosensitive detector used to detect the image light focused thereon by the optical system may be a charge-coupled device (CCD), although other devices may be used. A typical CCD may comprise an array of individual cells or "pixels," each of which collects or builds-up an electrical charge in response to exposure to light. Since the quantity of the accumulated electrical charge in any given cell or pixel is related to the intensity and duration of the light exposure, a CCD may be used to detect light and dark spots of an image focused thereon.

The term "image light" as used herein refers to the light that is focused onto the surface of the detector array by the optical system. Depending on the type of scanner and the type of document, the image light may be reflected from the document or object being scanned or it may be transmitted through the object or document. The image light may be converted into digital signals in essentially three steps. First, each pixel in the CCD detector converts the light it receives into an electric charge. Second, the charges from the pixels are converted into analog voltages by an analog amplifier. Finally, the analog voltages are digitized by an analog-to-digital (A/D) converter. The digital signals then may be processed and/or stored as desired.

While portable image scanners of the type described above are being used, they are not without their problems. For example, the quality of the image data produced by a scanner is usually related to the quality of the illumination that is provided to the scan region. If the illumination is not sufficiently bright, the result may be excessive noise in the image data which may manifest itself as "snow." Other problems may appear if the level of illumination is not substantially uniform along the length of the scan line. In such cases, the resulting image data may be of variable quality along the length of the scan line. Extreme variations of illumination may even result in "drop outs" in the image data.

Still other problems may develop if the illumination system is to be used with a battery powered hand-held or portable image scanner. For example, in order to minimize the power drain on the battery most portable image scanners are designed to provide the minimum amount of illumination commensurate with good image quality. Unfortunately, however, such low power illumination systems provide little margin against illumination variations. Consequently, even slight variations in illumination may well result in portions of the scan line being insufficiently illuminated. Another problem with many illumination systems is that only a small fraction of the light produced by the light source is used to illuminate the scan region.

SUMMARY OF THE INVENTION

A compact illumination system for illuminating a scan region on an object may comprise a light source for producing a plurality of light rays. A first reflector is positioned adjacent the light source and is coplanar with a first plane that is located in generally parallel, spaced-apart relation to a scan plane. The first reflector directs toward the scan region some of the light rays produced by the light source. A second reflector is positioned adjacent the light source and is coplanar with a second plane that is not parallel to the scan plane. The second reflector directs toward the scan region some of the light rays produced by the light source.

Also disclosed is a method for illuminating a scan region on an object that comprises the steps of: Generating a plurality of light rays from a light source; reflecting some of the plurality of light rays off a first reflector positioned adjacent the light source and coplanar with a first plane, the first plane being located in generally parallel, spaced-apart relation to a scan plane, the first reflector directing some of the light rays toward the scan region; and reflecting some of the plurality of light rays from the light source off a second reflector positioned adjacent the light source and coplanar with a second plane, the second plane not being parallel to the scan plane, the second reflector directing some of the light rays toward the scan region.

BRIEF DESCRIPTION OF THE DRAWING

Illustrative and presently preferred embodiments of the invention are shown in the accompanying drawing in which.

DETAILED DESCRIPTION OF THE INVENTION

Figure 1:
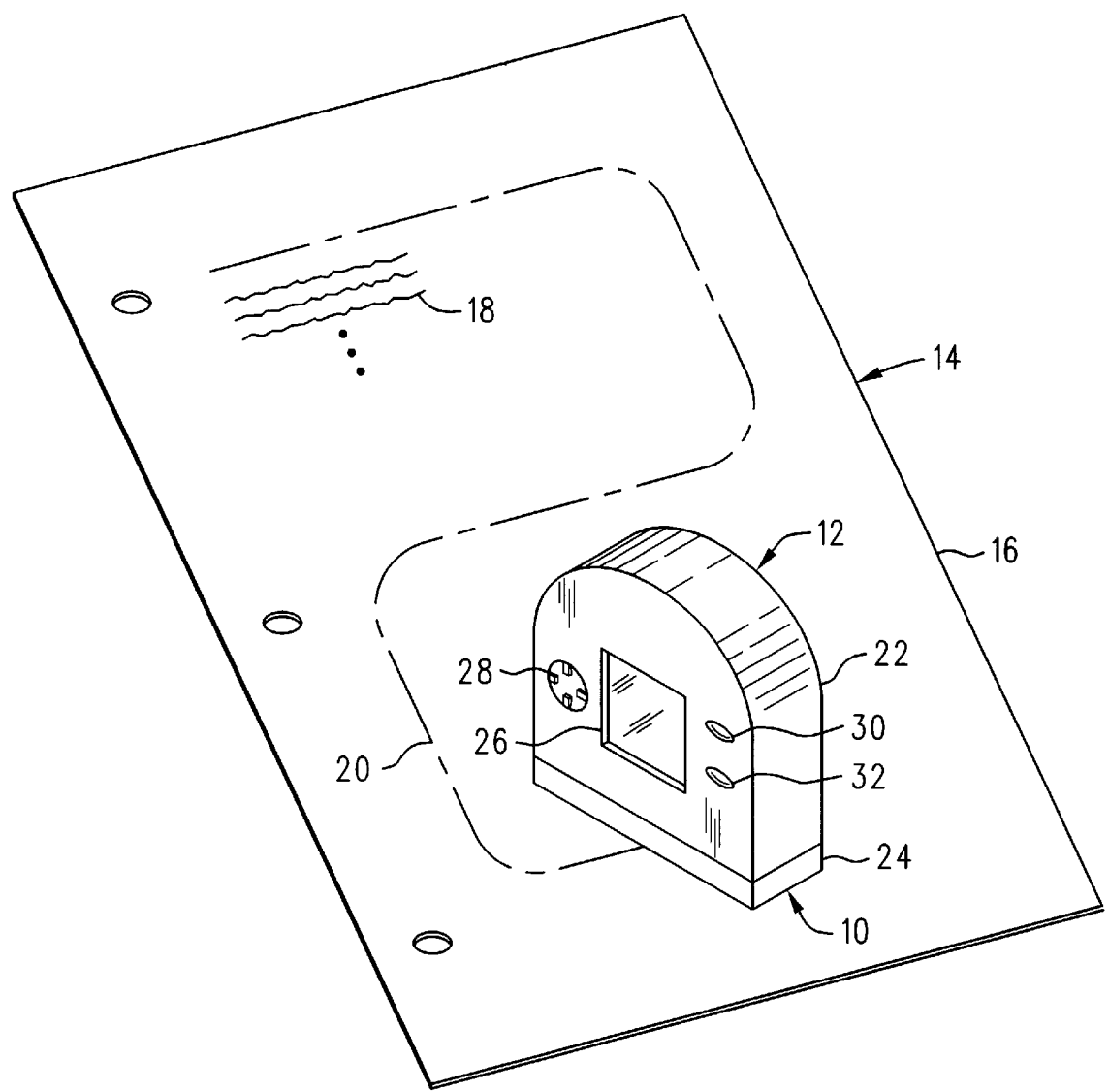
FIG. 1 is a perspective view of a portable scanner device having a compact illumination system according to the present invention.

A compact illumination system 10 according to the present invention is shown in FIG. 1 as it could be used in a hand-held or portable image scanner 12 to scan an object 14, such as a document 16 with written text 18 provided thereon. For example, in the application illustrated in FIG. 1, the entire document 16 may be scanned by moving the portable image scanner 12 over the document 16 along a meandering or curvilinear scanning path 20. As will be explained in greater detail below, the compact illumination system 10 associated with the portable image scanner 12 provides for improved illumination of a scan region 42 (FIG. 4) on the object 14.

Figure 2:
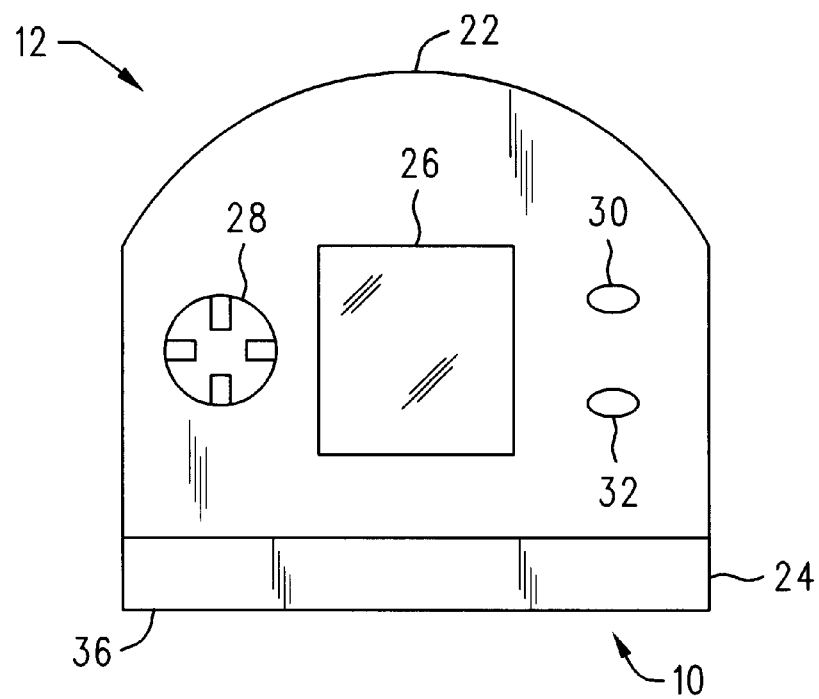
FIG. 2 is a front view in elevation of the portable scanner device shown in FIG. 1.
Figure 3:
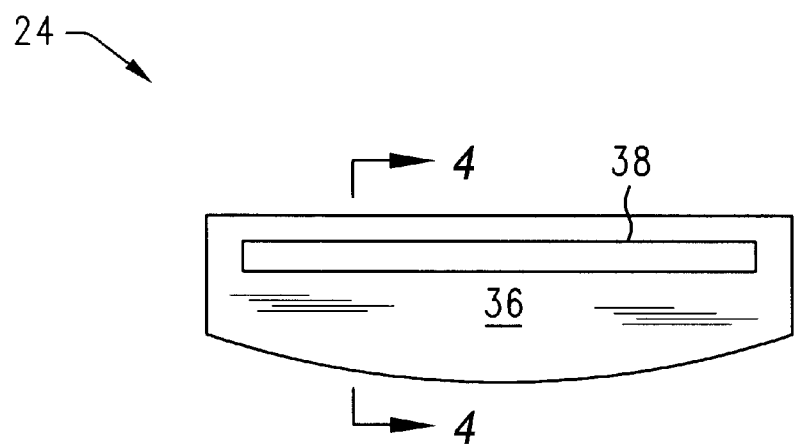
FIG. 3 is an elevation view of the contact surface of the image head of the portable scanner device.
Figure 4:
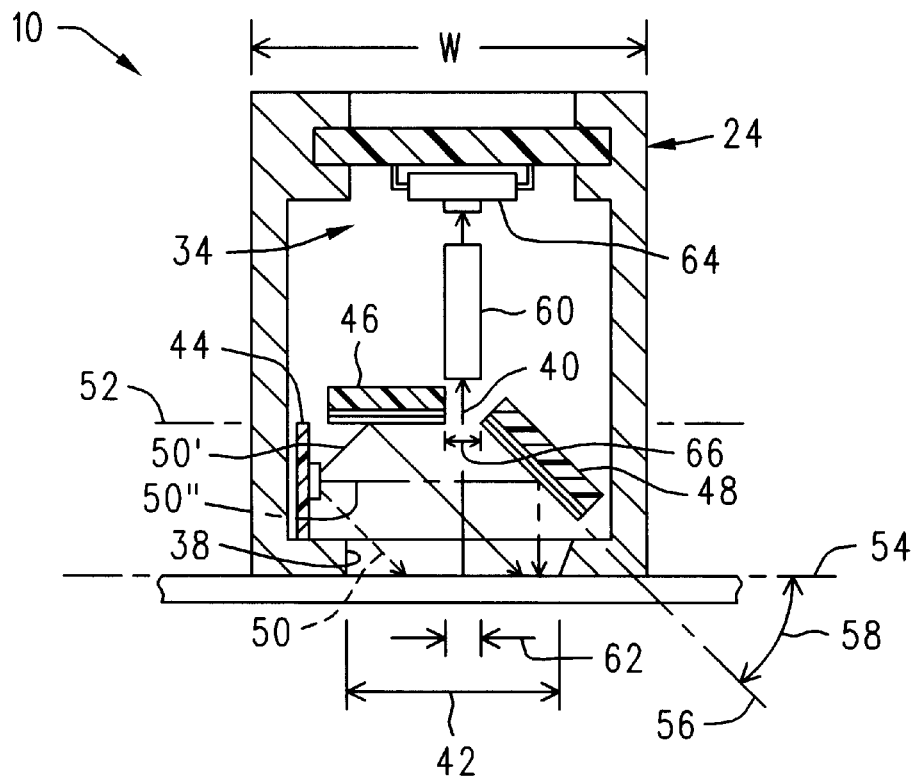
FIG. 4 is a cross-section view in elevation of the image head of the portable scanner device taken along the line 4—4 of FIG. 3.

Referring now primarily to FIGS. 2–4, one embodiment of the portable image scanner 12 may comprise a main body portion 22 having an image head portion 24 associated therewith. The main body portion 22 of the portable image scanner 12 may be sized to receive the various electronic components and other devices (not shown) required for the operation of the portable image scanner 12. For example, in addition to housing the various electronic components (not shown) required for the operation of the portable image scanner 12, the main body portion 22 may also be provided with a display device 26, along with various buttons or switches 28, 30, and 32 to control the function and operation of the image scanner 12. The main body portion 22 may also be sized to receive a suitable power source, such as a battery (not shown), to provide electrical power to the portable image scanner 12.

The image head portion 24 of portable image scanner 12 is best seen in FIG. 4 may be configured to receive the compact illumination system 10 and also an image sensing system 34. The face or contact surface 36 (FIG. 3) of the image head portion 24 may be provided with an elongate aperture or slot 38 therein which allows the illumination system 10 to illuminate the scan region 42 on the object 14. The aperture or slot 38 also allows image light 40 reflected by the illuminated scan region 42 (FIG. 4) to be received by the image sensing system 34. The image sensing system 34 produces an image signal (not shown) based on the image light 40. Image data contained in the image signal (not shown) may then be processed or manipulated by an image processing system (not shown) to produce image data that is representative of the object 14.

As was briefly mentioned above, the compact illumination system 10 illuminates the scan region 42 of the object 14 and in one embodiment may comprise a light source assembly 44 and a pair of reflectors 46 and 48, as best seen in FIG. 4. The reflectors 46 and 48 reflect toward the scan region 42 light rays (e.g., 50' and 50") produced by the light source 44. In one embodiment, the arrangement of the reflectors 46 and 48 is such that the first reflector 46 is essentially coplanar with a first plane 52 which is located in parallel, spaced-apart relation from a scan plane 54. Scan plane 54 is essentially coplanar with the surface of the object 14, as best seen in FIG. 4. The second reflector 48 is essentially coplanar with a second plane 56 that is not parallel to the scan plane 54. Instead, the second plane 56 is generally oblique with respect to the scan plane 54, i.e., the second plane 56 intersects the scan plane 54 at an oblique angle 58. The first and second reflectors 46 and 48 are also positioned so that a gap 66 is created between the two reflectors 46 and 48. The gap 66 allows the image sensing system 34 to receive image light 40 reflected by the illuminated scan region 42. Gap 66 should be of sufficient size to avoid vignetting of the optical system 60 associated with the image sensing system 34.

The portable image scanner 12 may be operated as follows to scan an object 14, such as a document 16 with written text 18 thereon. As a first step, the user (not shown) would set-up or initialize the portable image scanner 12 to perform the scanning operation by actuating the appropriate buttons or switches (e.g., 28, 30, and 32) in accordance with the particular operational sequence for the specific scanner device 12. The user may then place the contact surface or face 36 of the scanner 12 against the document 16 and initiate the scanning operation. The light source assembly 44 utilized in one preferred embodiment produces a plurality of light rays (e.g., 50, 50', 50") over a substantial angle (nearly 180° for certain types of light sources). The first and second reflectors 46 and 48 reflect toward the scanning region 42 many of the light rays that would not otherwise reach the scan region 42. For example, some of the light rays 50' produced by the light source 44 will be reflected toward the scan region 42 by the first reflector 46. Similarly, other light rays 50" will be reflected toward the scan region 42 by the second reflector 48. Other light rays 50 produced by the light source assembly 44 will be directly incident on the scan region 42. Consequently, the scan region 42 is illuminated by light rays which follow at least three different paths (e.g., direct from the light source assembly 44 and via the first and second reflectors 46 and 48). The multi-path illumination provided by the compact illumination system 10 according to the present invention provides for generally increased and more uniform illumination of the scan region 42.

A significant advantage of the compact illumination system 10 according to the present invention is that it provides for improved illumination uniformity of the scan region 42, thereby generally enhancing the overall quality of the image data produced by the image sensing system 34. The compact illumination system 10 also directs toward the scan region 42 a greater portion of the light rays (e.g., 50, 50', 50") produced by the light source 44. Consequently, the compact illumination system 10 allows a lower power light source to be used while providing the same illumination as other types of illumination systems utilizing higher power light sources.

Use of a lower power light source to provide the same level of illumination can be a significant advantage in portable scanner applications where an on-board battery system provides the power required to operate the light source.

Still other advantages are associated with the compact illumination system 10. For example, besides directing additional light rays 50' toward the scan region 42, the first reflector 46 also serves as a light baffle to reduce the amount of stray light produced by the light source 44 that may inadvertently enter the optical system 60 of the image sensing system 34. The reduction in the amount of stray light entering the optical system 60 of the image sensing system 34 tends to improve the quality of the resulting scanned image data. The arrangement of the first and second reflectors 46 and 48 also reduces the lateral space required by the illumination system 10. That is, the compact illumination system 10 may allow the width W of the image head 24 to be reduced when compared with other types of illumination systems.

Having briefly described the compact illumination system 10 and its use in a portable image scanner 12, as well as some of its more significant features and advantages, the various embodiments of the compact illumination system 10 will now be described in detail. However, before proceeding with the detailed description it should be noted that while the compact illumination system 10 is shown and described herein as it could be used in a portable image scanner 12, it is not limited to use with any particular type or style of scanner device. For example, the compact illumination system 10 could also be used in a flatbed scanner. It should also be noted that while the portable image scanner 12 is shown and described herein as it may be used to scan an object 14, such as a document 16 with written text 18 thereon, it is not limited to use with any particular type of object 14. Indeed, the portable image scanner 10 may be used to scan almost any type of object imaginable. Accordingly, the compact illumination system 10 according to the present invention should not be regarded as limited to the particular type of portable scanner device and the applications shown and described herein.

With the foregoing considerations in mind, one preferred embodiment of the compact illumination system 10 is shown in FIGS. 1–4 as it could be used in a portable or hand-held image scanner 12 which may be used to scan an object 14, such as a document 16 with written text 18 thereon. In order to scan the entire document 16, it may be necessary for the user to move the portable image scanner 12 along a curvilinear or meandering scanning path 20. If so, the portable scanner device 12 may be provided with a navigation system (not shown) to allow image data (not shown) obtained along the meandering or curvilinear scanning path 20 to be "stitched" together to provide image data representative of the entirety of the scanned object. Exemplary navigation systems and stitching algorithms are disclosed in U.S. Pat. No. 5,089,712 of Holland for "Sheet Advancement Control System Detecting Fiber Pattern of Sheet" and U.S. Pat. No. 5,578,813 of Allen, et al., for "Freehand Image Scanning Device which Compensates for Non-Linear Movement," both of which are specifically incorporated herein by reference for all that they disclose. However, since the details of the navigation system and stitching algorithm that may be used in such a portable scanner device 12 are not necessary to understand or practice the present invention, the particular navigation system and stitching algorithm that may be utilized in one preferred embodiment of the portable image scanner 12 will not be described in further detail herein.

Referring now primarily to FIGS. 2–4, the portable image scanner 12 may be provided with a main body portion 22 and an image head portion 24. The main body portion 22 may comprise an overall configuration or shape conducive to hand manipulation by a user (not shown), although other configurations may also be used. In one preferred embodiment, the main body portion 22 may be sized to receive the various electronic components (not shown) required for the operation of the portable image scanner 12. Alternatively, some or all of the various electronic components may be located elsewhere and may be connected to the main body portion 22 by a suitable link, such as a cable (not shown). The main body portion 22 may also be provided with a display system 26 and various switching devices 28, 30, and 32 that may be required or desired for the operation of the portable image scanner 12. While the switching devices 28, 30, and 32 in one preferred embodiment are located on the front face of the main body portion 22 of scanner 12, they may be positioned at any convenient location on the portable image scanner 12. The electrical power required to operate the portable image scanner 12 may be provided by a suitable electrical power source, such as a battery (not shown), that may also be contained within the main body portion 22 of the portable image scanner 12. However, since the various electronic components, display devices, switching devices, and batteries that may be required or desired for use in a particular portable image scanner are well-known in the art and since descriptions of the various components are not required to understand or practice the present invention, the various components, e.g., electronic components (not shown), display device 26, switching devices 28, 30, and 32, etc., utilized in one preferred embodiment of the portable image scanner 12 will not be described in further detail herein.

The main body portion 22 of scanner 12 may be made from any of a wide range of materials, such as metals or plastics, suitable for the intended application. By way of example, in one preferred embodiment, the main body portion 22 is made from polycarbonate plastic, although other materials could also be used.

Referring now primarily to FIGS. 3 and 4, the image head portion 24 of portable scanner 12 may comprise a separate assembly that is attached to the main body portion 22. Alternatively, the image head portion 24 may comprise an integral part of the main body portion 22. In any event, the image head portion 24 may be sized to receive the image sensing system 34 and the compact illumination system 10. Essentially, the image sensing system 34 is responsive to image light 40 reflected by an illuminated scan line 62 generally contained within the bounds of the illuminated scan region 42. The image sensing system 34 produces an image signal (not shown) representative of the scan line 62. The image sensing system 34 may comprise any of a wide variety of imaging systems now known or that may be developed in the future that are suitable for producing image data relating to image light 40 reflected by the object 14 being scanned. Consequently, the present invention should not be regarded as limited to any particular type of imaging system or image system configuration. However, by way of example, the imaging system 34 utilized in one preferred embodiment of the invention may include an optical system 60 for directing to a detector assembly 64 image light 40 reflected by the scan line 62 contained within the illuminated scan region 42. The detector assembly 64 produces an image signal (not shown) related to the image light 40.

The various components of the image sensing system 34 may comprise any of a wide range of components and devices that are well-known in the art and that would be suitable for the particular application. For example, in one preferred embodiment, the optical system 60 used to direct and focus the image light 40 onto the surface of detector assembly 64 may comprise a contact image sensor (CIS), such as a contact image sensor of the type sold under the name SELFOC which is a registered trademark of the Nippon Sheet Glass Company, Limited. Alternatively, other types of imaging systems, such as projection imaging systems involving lenses and/or reflectors, could also be used. The detector assembly 64 may comprise a CCD array having a resolution of 300 dpi (dots per inch), such as type TS105, available from Texas Instruments, Inc., of Austin, Tex. Alternatively, other types of detectors having the same or other resolutions could also be used.

The compact illumination system 10 may also be housed within the image head portion 24 of the portable image scanner 12 and may include a light source assembly 44, a first reflector 46, and a second reflector 48. The first reflector 46 is positioned generally adjacent the light source assembly 44 and may be coplanar with a first plane 52 which may be located in generally parallel, spaced-apart relation to a scan plane 54. See FIG. 4. Alternatively, the first reflector 46 need not be exactly parallel to the scan plane 54 but could instead be tilted slightly as may be required in a particular installation to ensure that the first reflector 46 directs light produced by the light source 44 to the appropriate area of the scan region 42. Accordingly, the first reflector 46 should not be regarded as limited to being oriented so that it is exactly parallel to the scan plane 54. The position of the first reflector 46 generally between the light source assembly 44 and the optical system 60 also serves as a baffle and generally shields the optical system 60 from the light rays (e.g., 50) produced by the illumination system 44. The baffle effect provided by the first reflector 46 serves to further enhance image quality. The second reflector 48 is also positioned generally adjacent the light source assembly 44 and may be coplanar with a second plane 56 that is not generally parallel to the scan plane 54. Instead, the second plane 56 may intersect the scan plane 54 at a generally oblique angle, such as angle 58.

As mentioned above, the positions of the first and second reflectors 46 and 48 are such that they reflect toward the scan region 42 a substantial portion of the light rays (e.g., 50) produced by the light source assembly 44, thereby making more efficient use of the light rays 50 produced by the light source assembly 44 and also generally providing for improved uniformity of illumination of the scan region 42. For example, in one preferred embodiment, the scan region 42 is illuminated by light rays which may follow one of three (3) different paths. A first path may comprise a direct path in which light rays 50 produced by the light source 44 travel directly to the scan region 42. A second path may comprise an indirect path in which light rays 50' from the light source 44 are reflected by the first reflector 46 before being incident on the scan region 42. A third path may comprise another indirect path in which light rays 50" from the light source 44 may first be reflected by the second reflector 48 before being incident on the scan region 42.

In order to provide the foregoing multiple illumination paths, it may be necessary to position the first and second reflectors 46 and 48 at a number of different angles depending on the geometry of the particular installation. Accordingly, the present invention should not be regarded as limited to providing the two reflectors 46 and 48 at the exact angles and positions shown and described herein. However, by way of example, in one preferred embodiment, the first plane 52 is generally parallel to the scan plane 54, although it may be tilted somewhat depending on the particular application. The oblique angle 58 may be in the range of about 30° to about 60° (about 45° preferred), although other angles may also be used.

The first and second reflectors 46 and 48 may also be positioned so that a gap 66 is created therebetween. Gap 66 allows image light 40 reflected by the scan line 62 to be received by the optical system 60. The gap 66 should be of sufficient width to avoid vignetting of the image light 40. By way of example, in one preferred embodiment, the gap 66 may have a width of about 2 mm, although other widths could also be used, again depending on the geometry of the particular installation.

Figure 5:
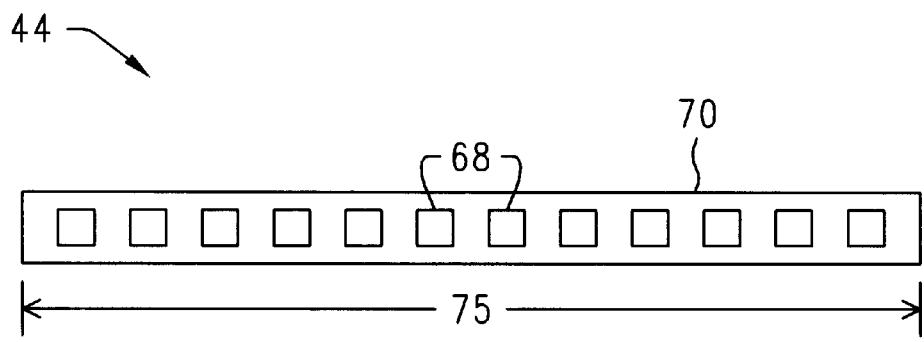
FIG. 5 is an elevation view of a light emitting diode array that may be used to illuminate the scan region.
Figure 6:
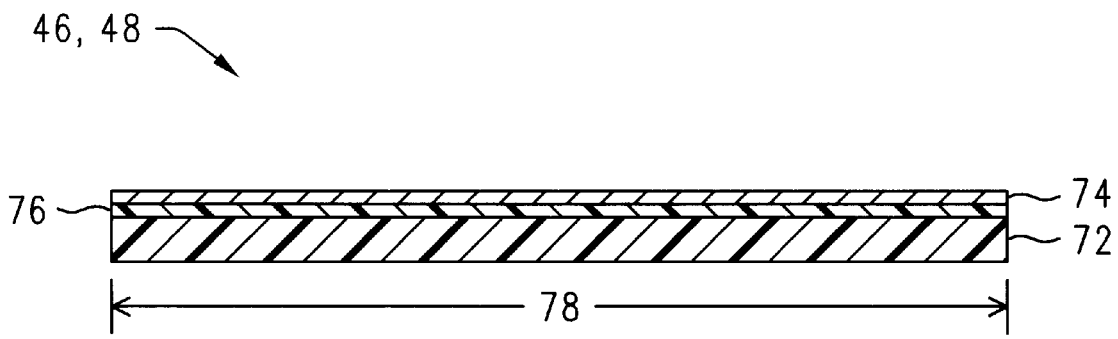
FIG. 6 is a cross-section view in elevation of a reflector assembly.

The light source 44 may comprise any of a wide range of light sources suitable for providing a plurality of light rays (e.g., 50). By way of example, in one preferred embodiment, the light source 44 may comprise a plurality of light emitting diodes 68 which may be positioned in spaced-apart relation on a suitable board or substrate 70, as best seen in FIG. 5. The board 70 may have a length 75 that is substantially coextensive with the length of the scan line 62 that is to be provided. In one preferred embodiment, the board 70 may have a length 75 in the range of about 120 mm to about 130 mm (123.2 mm preferred), although other lengths could also be used. Each light emitting diode 68 may comprise an LED part number HSMA-S690, available from Hewlett-Packard Company of Palo Alto, Calif. The light emitting diodes 68 utilized in one preferred embodiment produce a substantially uniform light output over a wide angle, nearly 180° in some cases. The number of LEDs 68 provided on the board 70 will depend on the length of the board 70 as well as on the desired intensity of the illumination that is to be provided to the scan region 42. By way of example, in one preferred embodiment, the board 70 may be provided with eighteen (18) separate light emitting diodes 68.

Each reflector 46, 48 may involve a similar construction and may include a generally elongate base or substrate portion 72 which may be provided with a reflective surface 74 thereon. See FIG. 5. Each reflector 46, 48 may have a length 78 that is substantially coextensive with the length of the scan line 62, although this not necessarily be so. The reflective surface 74 may be provided directly on the substrate 72. Alternatively, the reflective surface 74 may be provided on an intermediate layer 76. For example, in one embodiment, the substrate portion 72 may comprise glass and the reflective surface 74 may comprise aluminum. The reflective aluminum surface 74 may be deposited directly on the glass substrate 72 by any of a wide range of well-known processes, such as by sputtering or by vacuum vapor deposition. In another embodiment, the base or substrate portion 72 may comprise a plastic material, such as polycarbonate plastic. If a plastic substrate 72 is utilized, then it may be advantageous to provide an intermediate layer 76 of urethane or other similar material in order to provide a smooth surface for the aluminum reflective layer 74. Alternatively, a plastic substrate 72 may be made reflective by placing a metallized Mylar® material on the surface of the substrate 72. The metallized Mylar® material may be affixed to the plastic substrate 72 by any of a wide range of adhesives which are readily commercially available. Alternatively, an adhesive backed metallized Mylar® material, such as part no. 3302-02, available from Steven Label of Denver, Colo. may also be used.

Figure 7:
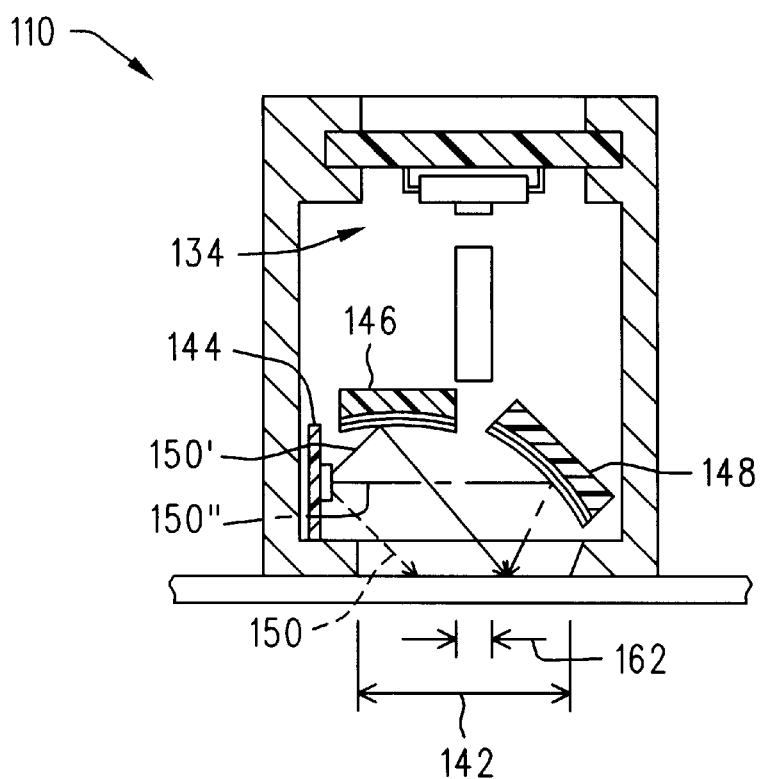
FIG. 7 is a cross-section view in elevation of a second embodiment of the compact illumination system utilizing non-planar reflectors.

Another embodiment 110 of the compact illumination system according to the present invention is illustrated in FIG. 7. The second embodiment 110 is similar to the first embodiment 10 described above, except that the first and second reflectors 146 and 148 of the second embodiment 110 may be provided with non-planar reflecting surfaces. The non-planar reflecting surfaces may be provided to direct or focus the light rays produced by the light source 144 on desired areas of the scan region 142. For example, in the embodiment 110 shown in FIG. 7, both the first reflector 146 and the second reflector 148 are provided with concave reflecting surfaces to direct more of the light rays produced by the light source 144 toward the region of the scan line 162. For example, the first reflector 146 may be shaped and/or positioned so that more of the light rays 50' produced by the light source assembly 144 are directed toward the scan line area 162 of the scan region 142. Similarly, the second reflector 148 may be shaped and/or positioned so that more of the light rays 50" produced by the light source assembly 144 are directed toward the scan line area 162 of the scan region 142. The curved reflecting surfaces of the first and second reflectors 146 and 148 thereby direct more of the light rays produced by the light source 144 to the part of the scan region 142 where it is most needed, i.e., in the scan line area 162. Image light 140 reflected by the scan line area 162 may then be received by the image sensing system 134 which produces image data signals (not shown) related to the image data in the manner described above.

The degree and type of curvature (e.g., cylindrical, spherical, toroidal, etc.) provided to the first and second reflectors 146 and 148 will depend in large part on the geometry of the particular device in which the illumination system 110 is to be used. Consequently, the present invention should not be regarded as limited to reflectors having any particular degree and type of curvature. By way of example, in one preferred embodiment, both the first and second reflectors 146 and 148 may be provided with cylindrical curvature having focal lengths in the range of 3 mm to 10 mm. The structures of first and second reflectors 146 and 148 may be essentially identical to the structures of the first and second reflectors 46 and 48 of the first embodiment 10. That is, the first and second reflectors 146 and 148 may comprise respective substrate portions on which are provided surface layers of reflective material.

It is contemplated that the inventive concepts herein described may be variously otherwise embodied and it is intended that the appended claims be construed to include alternative embodiments of the invention except insofar as limited by the prior art.

What is claimed is:

1. An illumination system for illuminating a scan region on an object, comprising:
   a light source for producing a plurality of light rays;
   a first reflector positioned adjacent said light source and coplanar with a first plane, the first plane being located in generally parallel, spaced-apart relation to a scan plane, said first reflector directing some of said light rays toward the scan region; and
   a second reflector positioned adjacent said light source and coplanar with a second plane, the second plane being non-parallel with the scan plane, said second reflector directing some of said light rays toward the scan region.

2. The illumination system of claim 1, wherein the plurality of light rays produced by said light source extend along a direction that is generally transverse to a scanning direction.

3. The illumination system of claim 2, wherein said first reflector comprises an elongate reflector that extends along the transverse direction.

4. The illumination system of claim 3, wherein said second reflector comprises an elongate reflector that extends along the transverse direction.

5. The illumination system of claim 4, wherein said light source comprises a generally elongate member that extends along the transverse direction.

6. The illumination system of claim 5, wherein said first reflector is substantially coextensive with the elongate member comprising said light source.

7. The illumination system of claim 6, wherein said second reflector is substantially coextensive with the elongate member comprising said light source.

8. The illumination system of claim 1, wherein said first reflector comprises a planar reflector.

9. The illumination system of claim 1, wherein said second reflector comprises a planar reflector.

10. The illumination system of claim 1, wherein said light source comprises a plurality of light emitting diodes positioned in spaced-apart relation so that said plurality of light emitting diodes extend along a direction that is substantially transverse to a scanning direction.

11. The illumination system of claim 10, wherein said first reflector comprises a generally elongate member having a generally planar reflecting surface.

12. The illumination system of claim 11, wherein said second reflector comprises a generally elongate member having a generally planar reflecting surface.

13. The illumination system of claim 12, wherein the second plane intersects the scan plane at an oblique angle.

14. The illumination system of claim 13, wherein the oblique angle comprises an angle in the range of about 30 degrees to about 60 degrees.

15. The illumination system of claim 14, wherein the generally planar reflecting surface of said first reflector comprises aluminum.

16. The illumination system of claim 14, wherein the generally planar reflecting surface of said second reflector comprises aluminum.

17. An illumination system for illuminating a scan region on an object, comprising:
   a plurality of light emitting diodes for producing a plurality of light rays, said plurality of light emitting diodes being positioned in spaced-apart relation along a direction that is substantially transverse to a scanning direction;
   a first reflector positioned adjacent said light source and coplanar with a first plane, the first plane being located in generally parallel, spaced-apart relation to a scan plane, said first reflector directing some of said light rays toward the scan region; and
   a second reflector positioned adjacent said light source and coplanar with a second plane, the second plane being non-parallel with the scan plane, said second reflector directing some of said light rays toward the scan region.

18. The illumination system of claim 17, wherein said first reflector comprises a generally elongate member having a reflective surface that is coextensive with said plurality of light emitting diodes.

19. The illumination system of claim 18, wherein said second reflector comprises a generally elongate member having a reflective surface that is coextensive with said plurality of light emitting diodes.

20. The illumination system of claim 19, wherein the reflective surfaces of said first and second reflectors comprise planar reflective surfaces.

21. The illumination system of claim 20, wherein the reflective surfaces of said first and second reflectors comprise curved reflective surfaces.

22. A method for illuminating a scan region on an object, comprising the steps of:

generating a plurality of light rays from a light source;

reflecting some of the plurality of light rays from the light source off a first reflector positioned adjacent the light source and coplanar with a first plane, the first plane being located in generally parallel, spaced-apart relation to a scan plane, the first reflector directing some of the light rays toward the scan region; and reflecting some of the plurality of light rays from the light source off a second reflector positioned adjacent the light source and coplanar with a second plane, the second plane being non-parallel with the scan plane, the second reflector directing some of the light rays toward the scan region.

23. A method for illuminating a scan region on an object, comprising the steps of:

providing a light source for producing a plurality of light rays;

positioning a first reflector adjacent the light source so that the first reflector is coplanar with a first plane that is generally parallel to a scan plane and so that the first reflector directs some of the light rays toward the scan region; and positioning a second reflector adjacent the light source so that the second reflector is coplanar with a second plane that is non-parallel with the scan plane and so that the second reflector directs some of the light rays toward the scan region.

24. An illumination system for illuminating a scan region on an object, comprising:

a light emitting diode having a light emitting side and a mounting side mounted so that the light emitting side of said light emitting diode is generally perpendicular to a scan plane, the light emitting side of said light emitting diode producing a plurality of light rays;

a first reflector positioned adjacent said light emitting diode and coplanar with a first plane, the first plane being located in generally parallel, spaced-apart relation to the scan plane, said first reflector directing toward the scan region some of the light rays produced by said light emitting diode; and a second reflector positioned adjacent said light emitting diode and coplanar with a second plane, the second plane being non-parallel with the scan plane, said second reflector directing some of said light rays toward the scan region.

* * * * *